United States Patent
Yang et al.

(10) Patent No.: US 10,211,473 B2
(45) Date of Patent: Feb. 19, 2019

(54) REDUCTION OF PRESSURE VARIATION WITH STAMPED EMBOSSMENT AT BEAD NEIGHBORS

(71) Applicant: GM GLOBAL TECHNOLOGY OPERATIONS LLC, Detroit, MI (US)

(72) Inventors: Xi Yang, Bloomfield Hills, MI (US); Ivan D. Chapman, Victor, NY (US); Siguang Xu, Rochester Hills, MI (US); Liang Xi, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 15/356,937

(22) Filed: Nov. 21, 2016

(65) Prior Publication Data

US 2018/0145353 A1 May 24, 2018

(51) Int. Cl.
| | |
|---|---|
| *H01M 8/04082* | (2016.01) |
| *H01M 4/86* | (2006.01) |
| *H01M 8/04029* | (2016.01) |
| *H01M 8/04089* | (2016.01) |
| *H01M 8/1004* | (2016.01) |
| *H01M 8/1018* | (2016.01) |
| *H01M 8/0206* | (2016.01) |
| *H01M 8/0267* | (2016.01) |

(52) U.S. Cl.
CPC ..... *H01M 8/04201* (2013.01); *H01M 4/8605* (2013.01); *H01M 8/0206* (2013.01); *H01M 8/0267* (2013.01); *H01M 8/04029* (2013.01); *H01M 8/04104* (2013.01); *H01M 8/1004* (2013.01); *H01M 8/1018* (2013.01); *H01M 2008/1095* (2013.01)

(58) Field of Classification Search
CPC .......... H01M 8/04201; H01M 8/1018; H01M 8/1004; H01M 4/8605; H01M 8/04104; H01M 8/04029
See application file for complete search history.

(56) References Cited

U.S. PATENT DOCUMENTS

| | | | | |
|---|---|---|---|---|
| 2004/0072053 | A1* | 4/2004 | Schlag | H01M 8/0267 219/121.64 |
| 2004/0142224 | A1* | 7/2004 | Abd Elhamid | H01M 8/0206 429/435 |
| 2009/0197147 | A1* | 8/2009 | Fly | H01M 8/0276 429/509 |
| 2012/0129073 | A1* | 5/2012 | Spencer | H01M 8/0247 429/460 |
| 2013/0045434 | A1* | 2/2013 | Skala | H01M 8/0271 429/465 |
| 2014/0065509 | A1* | 3/2014 | Skala | H01M 8/0276 429/460 |
| 2018/0097242 | A1* | 4/2018 | Xu | H01M 8/1004 |
| 2018/0123144 | A1* | 5/2018 | Yang | H01M 8/0267 |

* cited by examiner

*Primary Examiner* — Stewart A Fraser
(74) *Attorney, Agent, or Firm* — Reising Ethington P.C.

(57) ABSTRACT

A fuel cell flow field plate providing a uniform gas flow pressure includes a first metal plate and a second metal plate. The first metal plate defines a first opening for providing a first reactant gas to a fuel cell with a first metal bead that surrounds the first opening. The first metal bead is an embossment in the second metal plate that defines a first channel. The first metal plate also defines a first pressure distributing structure that decreases pressure variation is a seal formed with the first metal bead. A second metal plate aligns with the first metal plate.

18 Claims, 8 Drawing Sheets

REDUCTION OF PRESSURE VARIATION WITH STAMPED EMBOSSMENT AT BEAD NEIGHBORS

TECHNICAL FIELD

In at least one aspect, the present invention is related to fuel cell flow field plates providing uniform seal contact pressure distributions.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane ("PEM") type fuel cells, hydrogen is supplied to the anode as fuel, and oxygen is supplied to the cathode as the oxidant. The oxygen can either be in pure form (O2) or air (a mixture of O2 and N2). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Typically, the ion conductive polymer membrane includes a perfluorosulfonic acid ("PFSA") ionomer.

The MEA is sandwiched between a pair of porous gas diffusion layers ("GDL"), which in turn are sandwiched between a pair of electrically conductive elements or plates referred to as flow fields. The flow fields function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power.

In the current flow field designs, the seal path on bi-polar plate includes variable curvatures, especially in the port area. Bead contact pressure is higher when curvature is small. If double bead design is used (two beads aligned parallel and very close to each other), higher pressure will be presented. The current method to reduce high pressure spot is to use larger radius or increase the bead base.

Accordingly, the present invention provides improved contact pressure having less pressure variation along the metal bead seal

SUMMARY

The present invention solves one or more problems of the prior art by providing in at least one embodiment a fuel cell flow field plate providing a uniform contact pressure/seal pressure. The flow field includes a first metal plate and a second metal plate. The first metal plate defines a first opening for providing a first reactant gas to a fuel cell with a first metal bead surrounds the first opening. The first metal bead is an embossment defined by the first metal plate. The first metal plate also defines a first pressure distributing structure that decreases pressure variation is a seal formed with the first metal bead. Typically, the second metal plate is of a similar design. Specifically, the second metal plate defines a second opening for providing a second reactant gas to a fuel cell with a second metal bead that surrounds the second opening. The second metal bead is an embossment in the second metal plate. The first metal plate also defines a second pressure distributing structure that decreases pressure variation is a seal formed with the first metal bead. Advantageously, the present embodiment provides uniform contact pressure along the entire seal path. Moreover, high bead contact pressure is lowered thereby matching up with the rest area of the bead, resulting in a more uniform pressure distribution.

In another embodiment, a fuel cell incorporating the flow fields described herein is provided. The fuel cell includes a cathode catalyst layer, an anode catalyst layer, and an ion conducting membrane interposed between the cathode catalyst layer and the anode catalyst layer. A first gas diffusion layer is disposed over and adjacent to the cathode catalyst layer and a second gas diffusion layer disposed over and adjacent to the anode catalyst layer. A first flow field disposed over and adjacent to the first gas diffusion layer and a second flow field disposed over and adjacent to the second gas diffusion layer. The first flow field includes a first metal plate and a second metal plate. The first metal plate defines a first opening for providing a first reactant gas to a fuel cell with a first metal bead surrounds the first opening. The first metal bead is an embossment defined by the first metal plate. The first metal plate also defines a first pressure distributing structure that decreases pressure variation is a seal formed with the first metal bead. Typically, the second metal plate is of a similar design. Specifically, the second metal plate defines a second opening for providing a second reactant gas to a fuel cell with a second metal bead that surrounds the second opening. The second metal bead is an embossment defined by the second metal plate. The first metal plate also defines a first pressure distributing structure that decreases pressure variation is a seal formed with the first metal bead. Typically, the second flow field is of the same design as the first flow field.

DETAILED DESCRIPTION

Figure 1:
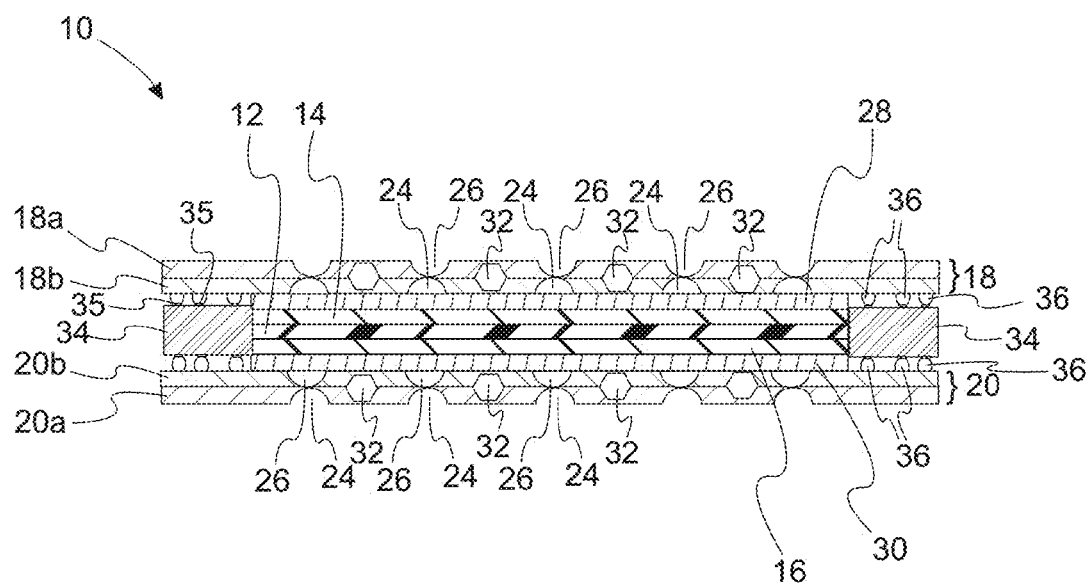
FIG. 1 provides a schematic illustration of a fuel cell incorporating a flow field defining flow channels with improved pressure distribution.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

With reference to FIG. 1, an idealized schematic cross section of a fuel cell having a flow field plate with pressure distributing structures is provided. Proton exchange membrane (PEM) fuel cell 10 includes polymeric ion conducting membrane 12 disposed between cathode catalyst layer 14 and anode catalyst layer 16. Fuel cell 10 also includes flow fields 18, 20 which define gas flow channels 24 and 26. Gas diffusion layers 28 and 30 disposed between flow fields 18, 20 and cathode catalyst layer 14 and anode catalyst layer 16, respectively. During operation of the fuel cell 10, a fuel such as hydrogen is feed to anode catalyst layer 16 through gas flow channels 26 and an oxidant such as oxygen is feed to cathode catalyst layer 14 through gas flow channels 24. Flow fields 18, 20 also define cooling channels 32 which are used to flow coolant through the flow field plates. It should be appreciated that flow fields 18, 20 are each typically formed from two metal plates. For example, flow field 18 is formed from channel-defining plates 18a and 18b while flow field 20 is formed from channel-defining plates 20a and 20b. Characteristically, channel-defining plates 18a, 18b, 20a, 20b define pressure distributing structures as set forth below in more detail. In a refinement, metal plates 18a, 18b, 20a, 20b have a thickness from about 0.05 mm to 0.5 mm. It should also be pointed out that FIG. 1 is an idealized schematic and that gas flow channels 24 and 26 are also formed by embossing plates 18a, 18b, 20a and 20b. FIG. 1 also depicts the side sealing of the fuel cell in which peripheral gasket 34 seals to embossments 36. Hydrogen ions are generated by anode catalyst layer 16 migrate through polymeric ion conducting membrane 12 were they react at cathode catalyst layer 14 to form water. This electrochemical process generates an electric current through a load connect to flow field plates 18 and 20.

Figure 2:
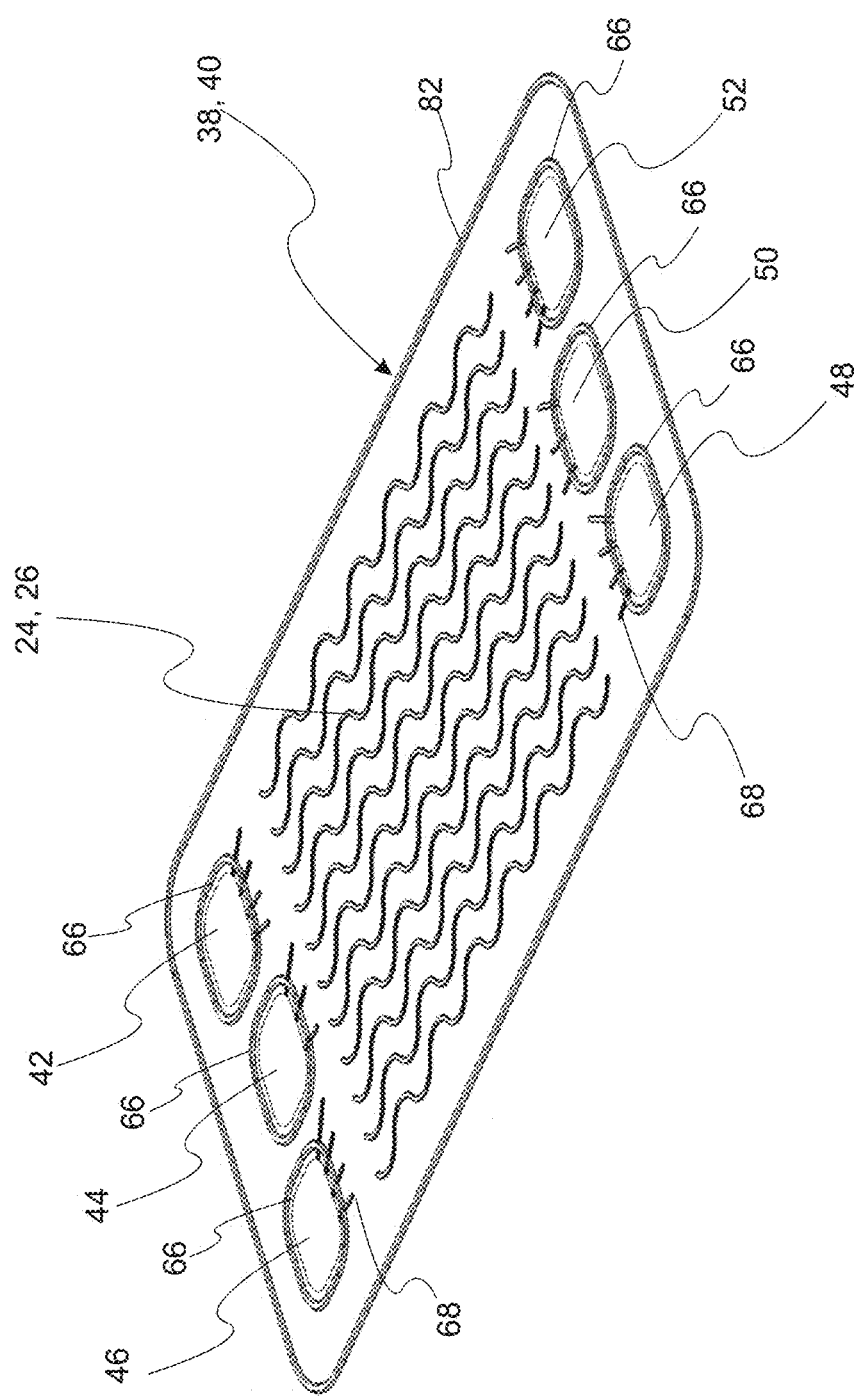
FIG. 2 is a perspective view of a metal plate used to form a fuel cell flow field.

With reference to FIGS. 1 and 2 schematic illustrations show that flow fields 18, 20 are each typically formed from two metal plates are provided. For example, flow field 18 is formed from channel-defining plates 18a and 18b while flow field 20 is formed from channel-defining plates 20a and 20b. These channels and other structures are typically formed by stamping. Moreover, the metal plates including a number of openings for input and exhausting reactant gases and coolant. FIG. 2 is a perspective view of a metal plate that is typical of the design of embossed plates 18a, 18b, 20a, and 20b. Metal plates 38, 40 define openings 42-52 for introducing or exiting a liquid coolant or reactants to the flow field. In a refinement, channel-defining plates 18a defines first metal bead 66 which surrounds one or more of openings 42-52. First metal bead 66 is an embossment in metal plates 38, 40 that defines a first channel 80. Typically, the liquid coolant flows or reactants through this channel. In a refinement, a soft material (e.g., elastomer, rubber, foam, etc.) is coated on the top of metal bead 66 to make a seal between adjacent flow fields (see item number 35 in FIG. 1). Similarly, each of metal-defining plates 18b, 20a, and 20b are similarly designed. For example, channel-defining plate 18b which mates to channel-defining plate 18a defines second metal bead 66' which surrounds one or more of openings 42-52. Second metal bead 66' is an embossment in metal plates 38, 40 that defines a second channel 80'.

Figure 3:
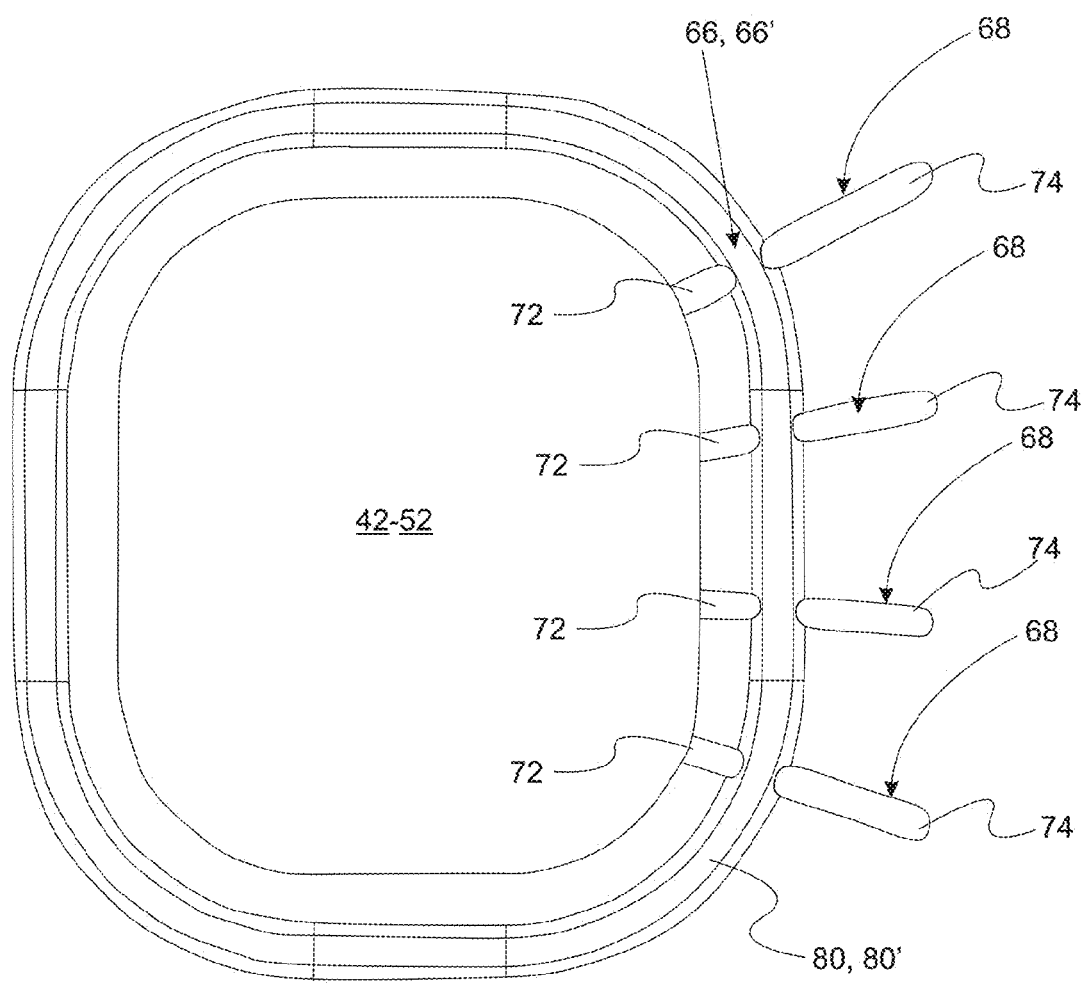
FIG. 3 is a top view a portion of a flow field defining an opening for inputting or outputting a reactant gases or coolant to a flow field.

With reference to FIG. 3, plurality of tunnels 68 provides a passage into and out of the first metal bead 66 (or second metal bead 66'). First metal bead 66 (or second metal bead 66') surrounds openings 42-52. First metal bead 66 (or second metal bead 66') defines a first channel 80 (or second channel 80'). In a refinement, a soft material (e.g., elastomer, rubber, foam, etc.) is coated on the top of first metal bead 66 (or second metal bead 66') to make a seal between adjacent flow fields. Plurality of tunnels 68 provides a passage into and out of the channel 80 (or channel 80') which is defined by first metal bead 66 (or second metal bead 66'). Each tunnel 68 of the first plurality of tunnels has an inlet tunnel section 72 that leads to the first channel 80 (or second channel 80') and an outlet tunnel section 74 that extends from the first channel 80 (or second channel 80') to provide a reactant gas or coolant to flow channels 24, 26.

Figure 4A:
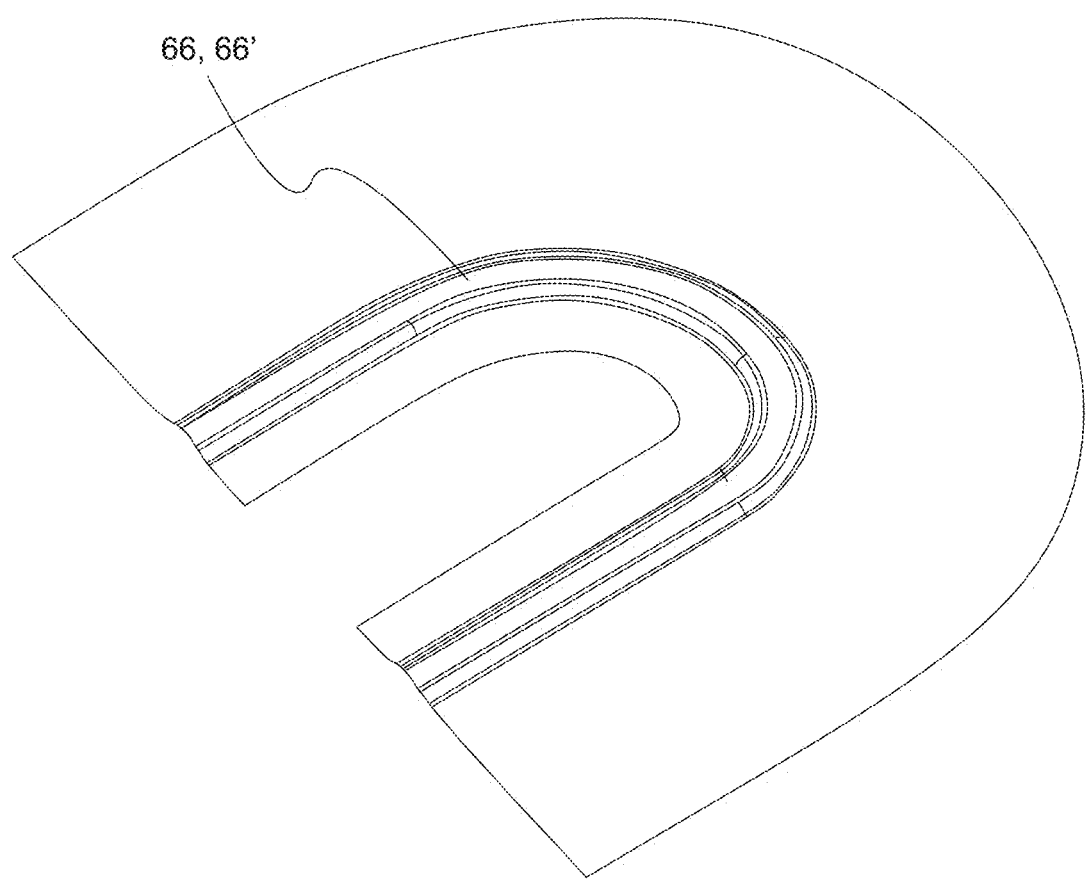
FIG. 4A is a perspective view of a portion of a metal plate defining a metal bead without flanking pressure distributing beads.
Figure 4B:
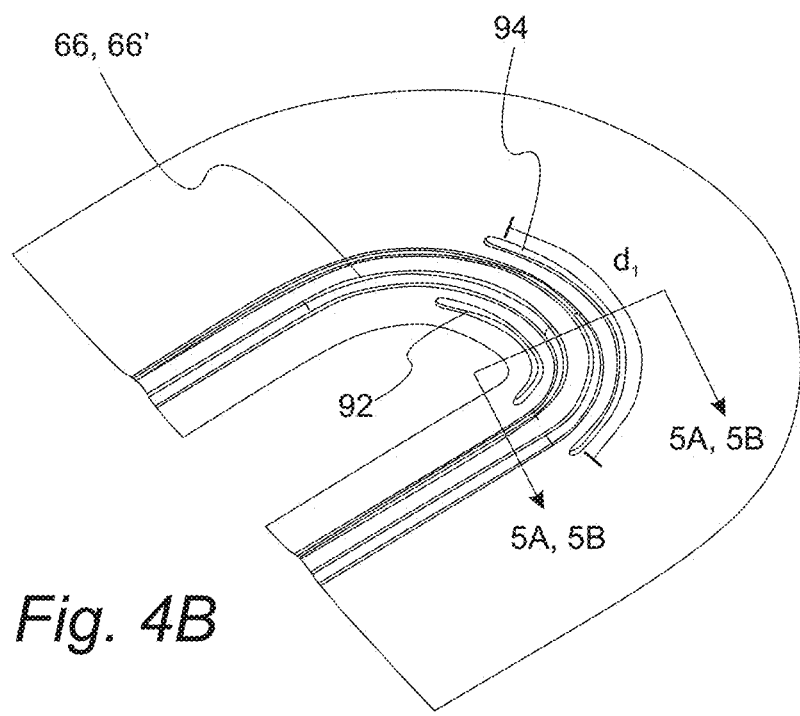
FIG. 4B is a perspective view of a portion of a metal plate defining a metal bead with flanking pressure distributing beads.

With reference to FIGS. 4A and 4B, schematics of an embossment about an opening in a channel-defining plate are provided. FIG. 4A illustrates the situation in which first metal bead 66 and/or second metal bead 66' surround one of openings 42-52 without any pressure distributing structures. In contrast, FIG. 4b illustrates the situation in which first metal bead 66 and/or second metal bead 66' surround one of openings 42-52 with pressure distributing structures 90.

Figure 5A:
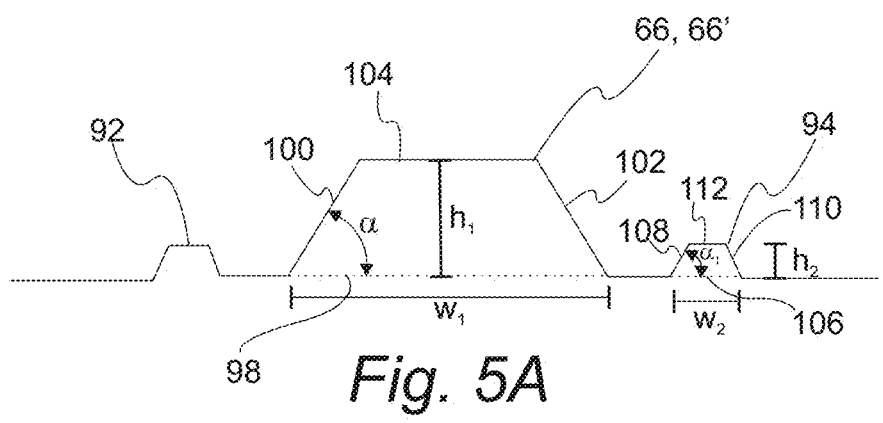
FIG. 5A is a cross section of a metal bead with flanking pressure distributing trapezoidal auxiliary beads.
Figure 5B:
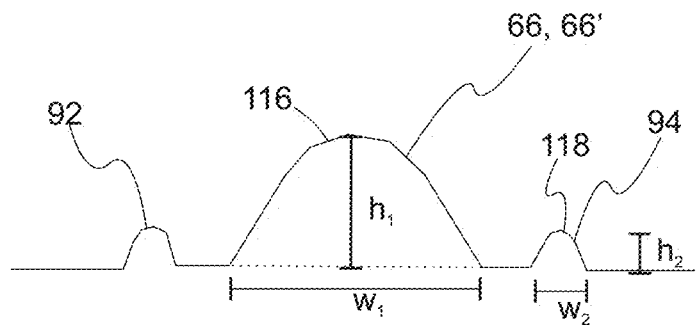
FIG. 5B is a cross section of a metal bead with flanking pressure distributing curved auxiliary beads.

With reference to FIGS. 4B, 5A, and 5A, pressure distributing structures 90 include at least one auxiliary bead 92 defined by channel-defining plate 18a and/or channel-defining plate 18b positioned proximate to first bead 66 and/or second bead 66'. In a refinement, pressure distributing structures 90 includes a pair of auxiliary beads 92, 94 defined by channel-defining plate 18a and/or channel-defining plate 18b. Auxiliary beads 92, 94 flank first bead 66 or second bead 66'. Typically, auxiliary beads 92, 94 extend for a limited distance $d_1$. Typically, d1 will be from 0.2 to 1 inch. The cross sectional shape of auxiliary beads 92, 94 is not limited to any particular shape. FIG. 5A illustrates a refinement in which the first bead 66, second bead 66', and auxiliary beads 92, 94 have a trapezoidal cross section. The trapezoidal cross section for first bead 66 and second bead 66' is defined by open base 98, trapezoid walls 100, 102, and top wall 104. The wall angle α (i.e., the angle between wall 100 (or 102) and open base 98) is typically from 10 to 80 degrees. Similarly, the trapezoidal cross section for auxiliary beads 92, 94 is defined by open base 106, trapezoid walls 108, 110, and top wall 112. The wall angle $α^1$ (i.e., the angle between wall 108 (or 110) and open base 106) is typically from 10 to 80 degrees. FIG. 5A illustrates a refinement in which the first bead 66, second bead 66', and auxiliary beads 92, 94 have a section 116, 118 respectively that is curved. The first metal bead 66 and the second metal bead 66' have a maximum height $h_1$ and a width at the open base $w_1$ (open base width w1). Similarly, auxiliary beads 92, 94 have a maximum height $h_2$ and an open base width $w_2$. Typically, the auxiliary bead height $h_2$ is less than the first metal bead height $h_1$. Similarly, the auxiliary bead width $w_2$ is less than the first or second metal bead height $w_1$. In a refinement, the maximum bead height $h_1$ is from about 0.1 mm to about 5 mm and the auxiliary bead height $h_2$ is from 0.05 mm to about 3 mm. In a refinement, the bead base width $w_1$ is from about 0.4 mm to about 4 mm and the auxiliary bead base width $w_2$ is from about 0.1 mm to about 3 mm. In a further refinement, first bead 66 and second bead 66' have an average cross sectional area from about 0.01 to 5 mm$^2$ and auxiliary beads 92, 94 have 0.005 to 3 mm$^2$. It should be appreciated that pressure distributing structures 90 can include additional openings (e.g., openings 124, 126) defined by channel-defining plate 18a and/or channel-defining plate 18b positioned proximate to first bead 66 and/or second bead 66'. It should be appreciated that the present embodiment is not limited by the number of such openings which can be 1 to 10 or more.

Figure 6:
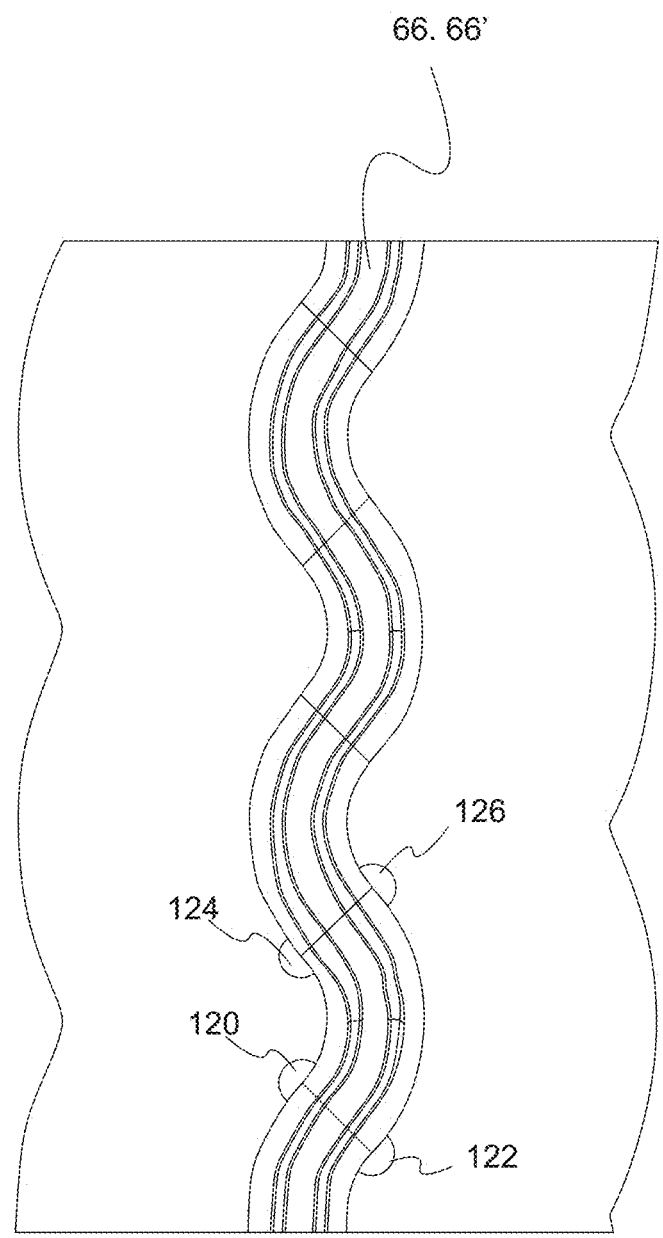
FIG. 6 is a cross section of a metal bead with flanking pressure distributing openings.

With reference to FIG. 6, pressure distributing structures 90 include at least one opening 120 defined by channel-defining plate 18a and/or channel-defining plate 18b positioned proximate to first bead 66 and/or second bead 66'. In a refinement, pressure distributing structures 90 includes a pair of openings 120, 122 defined by channel-defining plate 18a and/or channel-defining plate 18b. In a refinement, openings 120, 122 have an area from about 0.01 to 10 mm$^2$. It should be appreciated that pressure distributing structures 90 can include additional openings (e.g., openings 124, 126) defined by channel-defining plate 18a and/or channel-defining plate 18b positioned proximate to first bead 66 and/or second bead 66'. It should also be appreciated that the present embodiment is not limited by the number of such openings which can be 1 to 10 or more.

Figure 7A:
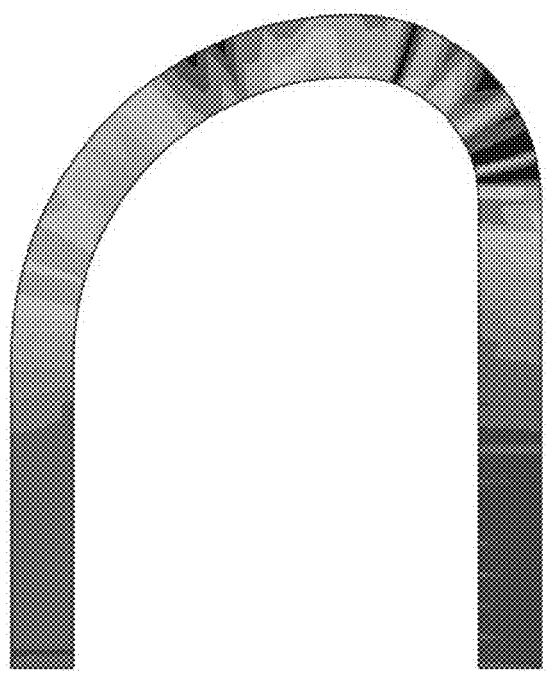
FIG. 7A provides the pressure field for a metal bead without flanking pressure distributing structures.
Figure 7B:
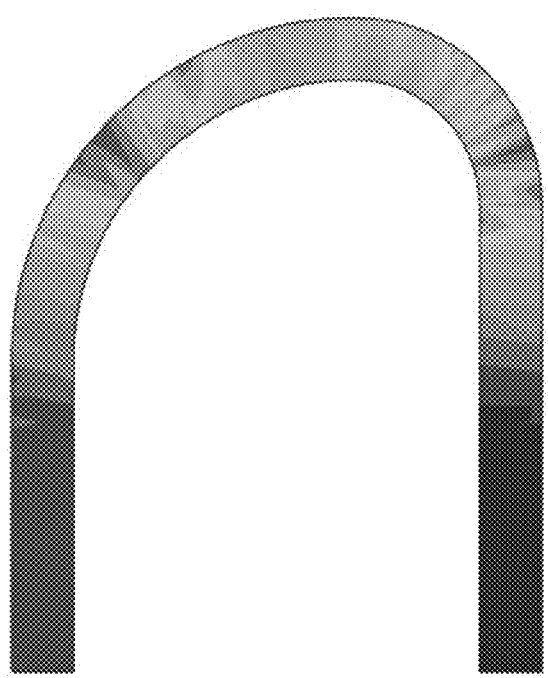
FIG. 7B provides for a metal bead with flanking pressure distributing beads.
Figure 7C:
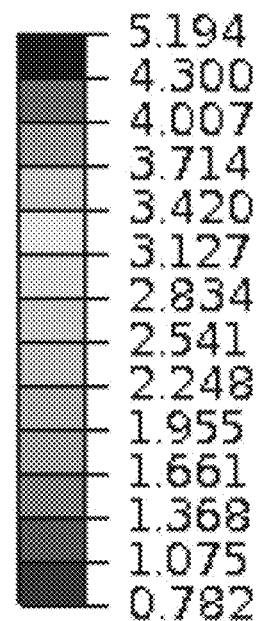
FIG. 7C provides a shading map of the pressures in FIG. 7A-B.
Figure 8:
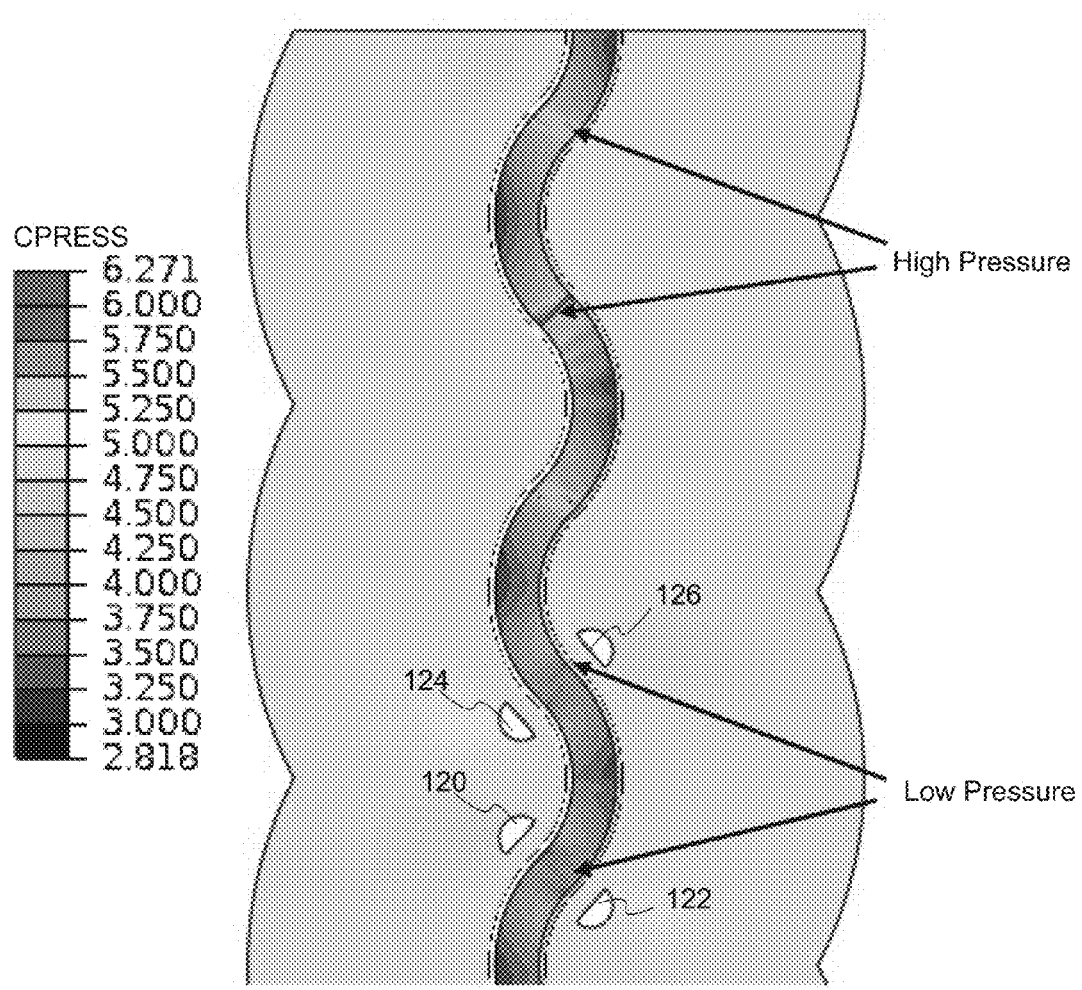
FIG. 8 provides the pressure field for a metal bead with flanking pressure distributing openings.

Pressure fields were determined by finite element analysis using a compression height of 100 microns. FIG. 7A provides the pressure field for a metal bead without flanking pressure distributing structure. The seal contact pressure range for the configuration of FIG. 7A at the tunnel area is about 4.4 MPa. FIG. 7B provides for a metal bead without flanking pressure distributing structure. The seal contact pressure range for the configuration of FIG. 7B is about 3.2 MPa. FIG. 7C provides a shading map of the pressures in FIG. 7A-B. FIG. 8 provides the pressure field for a metal bead with flanking pressure distributing openings. The seal contact pressure range for the configuration of FIG. 8 is about 3.0 MPa.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments, variations, and refinements may be combined to form further embodiments of the invention.

What is claimed is:

1. A flow field for a fuel cell, the flow field comprising:
  a first metal plate defining a first opening for providing a first reactant gas to a fuel cell, the first metal plate also defines a first metal bead that surrounds the first opening and the first metal bead being an embossment in the first metal plate that defines a first channel, the first metal plate also defining a first pressure distributing structure that decreases pressure variation in a seal formed with the first metal bead, wherein the first pressure distributing structure includes a pair of auxiliary beads defined by the first metal plate flanking the first metal bead, the first metal bead defining a first metal bead height and each auxiliary bead defining an auxiliary bead height such that the auxiliary bead height is less than the first metal bead height; and
  a second metal plate that aligns with the first metal plate.

2. The flow field of claim 1 wherein the first metal bead height is from about 0.1 mm to about 5 mm and the auxiliary bead height is from 0.05 mm to about 3 mm.

3. The flow field of claim 1 wherein the first metal bead and each auxiliary bead each independently have a trapezoidal cross section with an open base side.

4. The flow field of claim 1 wherein the first metal bead and each auxiliary bead each independently have a curved cross section.

5. The flow field of claim 1 wherein the first pressure distributing structure includes a pair of pressure distributing openings defined by the first metal plate flanking the first metal bead.

6. The flow field of claim 1 wherein the first metal plate defines a first plurality of tunnels that provide a passage into and out of the first metal bead, each tunnel of the first plurality of tunnels having an inlet tunnel section that leads to the first channel and an outlet tunnel section that extends from the first metal bead to provide the first reactant gas to first reactant gas flow channels defined by the first metal plate.

7. The flow field of claim 1 wherein the second metal plate defines second opening for providing a second reactant gas to a fuel cell and a second metal bead that surrounds the second opening, the second metal bead being an embossment in the second metal plate that defines a second channel, the second metal plate also defining a second pressure distributing structure that decreases pressure variation is a seal formed with the second metal bead.

8. The flow field of claim 7 wherein the second metal plate defines a second plurality of tunnels that provide a passage into and out of the second metal bead, each tunnel of the second plurality of tunnels having an inlet tunnel section that leads to the second channel and an outlet tunnel section that extends from the second metal bead to provide the second reactant gas to the second reactant gas flow channels defined by the second metal plate.

9. The flow field of claim 1 wherein the first metal plate further defines a cooling channel for flowing coolant.

10. The flow field of claim 1 wherein a soft material is coated on the first metal bead.

11. A fuel cell comprising
a cathode catalyst layer;
an anode catalyst layer;
an ion conducting membrane interposed between the cathode catalyst layer and the anode catalyst layer;
a first gas diffusion layer disposed over and adjacent to the cathode catalyst layer;
a second gas diffusion layer disposed over and adjacent to the anode catalyst layer;
a first flow field disposed over and adjacent to the first gas diffusion layer; and
a second flow field disposed over and adjacent to the second gas diffusion layer, the first flow field and second flow field each independently comprising:
a first metal plate defining a first opening for providing a first reactant gas to the fuel cell and a first metal bead that surrounds the first opening, the first metal bead being an embossment in the first metal plate that defines a first channel, the first metal plate also defining a first pressure distributing structure that decreases pressure variation in a seal formed with the first metal bead, wherein the first pressure distributing structure includes a pair of auxiliary beads defined by the first metal plate flanking the first metal bead; and
a second metal plate that aligns with the first metal plate.

12. The fuel cell of claim 11 wherein the first metal bead defines a first metal bead height and each auxiliary bead defines an auxiliary bead height such that the auxiliary bead height is less than the first metal bead height.

13. The fuel cell of claim 12 wherein the first metal bead height is from about 0.1 mm to about 5 mm and the auxiliary bead height is from 0.05 mm to about 3 mm.

14. The fuel cell of claim 11 wherein the first metal bead and each auxiliary bead each independently have a trapezoidal cross section with an open base side.

15. The fuel cell of claim 11 wherein the first metal bead and each auxiliary bead each independently have a curved cross section.

16. The fuel cell of claim 11 wherein the first pressure distributing structure includes a pair of pressure distributing openings defined by the first metal plate flanking the first metal bead.

17. The fuel cell of claim 11 wherein the first metal plate defines a first plurality of tunnels that provide a passage into and out of the first metal bead, each tunnel of the first plurality of tunnels having an inlet tunnel section that leads to the first channel and an outlet tunnel section that extends from the first metal bead to provide the first reactant gas to first reactant gas flow channels defined by the first metal plate.

18. The fuel cell of claim 11 wherein the second metal plate defines second opening for providing a second reactant gas to the fuel cell and a second metal bead that surrounds the second opening, the second metal bead being an embossment in the second metal plate that defines a second channel, the second metal plate also defining a second pressure distributing structure that decreases pressure variation is a seal formed with the second metal bead.

* * * * *